United States Patent [19]

Iyer et al.

[11] Patent Number: 5,281,644
[45] Date of Patent: Jan. 25, 1994

[54] AMBIENT TEMPERATURE HARDENING BINDER COMPOSITIONS

[75] Inventors: S. Raja Iyer, Naperville; David R. Armbruster, Forest Park, both of Ill.; Arthur H. Gerber, Louisville, Ky.

[73] Assignee: Borden, Inc., Columbus, Ohio

[21] Appl. No.: 971,396

[22] Filed: Nov. 4, 1992

[51] Int. Cl.$^5$ .............................. C08K 5/32
[52] U.S. Cl. .................. 524/259; 525/437; 525/441; 525/442; 525/473; 525/486; 525/488; 525/505; 525/506; 525/521; 525/534; 524/430; 524/441; 524/442; 528/125; 528/128; 528/138; 528/139; 528/272; 528/300; 528/394; 528/396; 523/139; 523/143; 523/146; 523/148
[58] Field of Search ............ 525/437, 441, 442, 473, 525/486, 488, 505, 506, 521, 534; 524/430, 259, 442, 441; 528/125, 128, 138, 139, 272, 300, 394, 396; 523/139, 143, 146, 148

[56] References Cited

U.S. PATENT DOCUMENTS

| | | | |
|---|---|---|---|
| 2,529,712 | 11/1950 | Teague | 51/298 |
| 2,531,863 | 11/1950 | Scott et al. | 260/43 |
| 2,760,951 | 8/1956 | Park et al. | 260/57 |
| 3,917,558 | 11/1975 | Gardakis et al. | 260/38 |
| 4,341,668 | 7/1982 | Martin et al. | 524/297 |
| 4,379,866 | 4/1983 | Henry, Jr. et al. | 523/140 |

FOREIGN PATENT DOCUMENTS 2045201 12/1991 Canada.

OTHER PUBLICATIONS

Technical Bulletin "TB60" of the Argus Chemical Company.

Primary Examiner—John Kight, III
Assistant Examiner—S. A. Acquah
Attorney, Agent, or Firm—George P. Maskas; Kenneth P. Van Wyck; Dennis H. Rainear

[57] ABSTRACT

There are disclosed methods and compositions for retarding the ambient temperature hardening of a phenolic resole resin alone or with an aggregate when such resin is contacted with a nitroalkane and a hardening agent such as lightburned magnesium oxide, an organic ester functional hardening agent, and mixtures of lightburned magnesium oxide and an organic ester functional hardening agent in an alkaline medium. There is also disclosed a hardener composition for phenolic resole resins wherein the hardener composition consists essentially of a solution of a nitroalkane in an organic ester functional hardening agent.

37 Claims, No Drawings

AMBIENT TEMPERATURE HARDENING BINDER COMPOSITIONS

BACKGROUND OF THE INVENTION (a) Field of the Invention

This invention relates to methods and compositions for retarding the ambient temperature hardening of a phenolic resole resin when such resin is contacted with a nitroalkane and a substance which hardens the resin under alkaline conditions at ambient temperature. This invention also relates to a hardening composition of a nitroalkane dissolved in an organic ester.

It is desirable to be able to easily control the rate of alkaline phenolic resole resin hardening when ambient temperature hardeners are used such as by being able to retard the gelation and hardening and maintain flowability, trowelability and other working properties of phenolic resole resin compositions. This is particularly the case in warm climates. The phenolic resole resin compositions of this invention include "binder compositions" for binding materials, e.g., an aggregate, or "raw batch compositions" which contain an aggregate and sufficient quantity of the binder composition to bind the aggregate on hardening of the binder.

Applicants have found that the ambient temperature hardening of a phenolic resole resin admixed with a hardening agent such as an organic ester functional hardening agent, lightburned magnesium oxide or mixtures of such esters and lightburned magnesium oxide under alkaline conditions can be retarded by including a nitroalkane in such mixture. The use of the nitroalkane extends the work life of the composition.

Retarding the ambient temperature hardening of a binder composition comprising an alkaline phenolic resole resin, a material which hardens the composition at room or ambient temperature and a retarder such as the nitroalkanes is particularly useful in the foundry and refractory arts. Illustratively, foundry core and molding operations involve mixing binder components with sand using suitable mixing equipment and forming various shapes with the help of pattern equipment. The quality of the cores and molds produced in a foundry determine the quality of castings produced from them. The strengths of cores and molds, as measured by the tensile strength of the mixed sand from which they are prepared, is an important criteria in establishing mold and core quality.

No-bake binder systems, i.e., room or ambient temperature hardening systems, used in foundries depend on their ability to uniformly coat sand grains which then cure into strong, rigid shapes at ambient conditions. One no-bake binder system is the "ester cure" process which uses a highly alkaline phenolic resole resin with a pH above 11 and an alkali to phenol molar ratio of 0.2:1 to 1.2:1. In a typical core and molding operation in a foundry, the binder components are mixed into sand in either a batch or a continuous mode and the mixed sand is discharged into a pattern. The mixed sand begins to cure, also referred to as hardening, immediately and it is essential to compact it in place in order to achieve optimum bonding strength. If the sand "pre-cures" before it is placed and compacted on a pattern, there is a deterioration in the bonding strength achieved. The term "work time" properties of a binder system is an approximation of the useful time available before the sand mix deteriorates due to precuring. A test to determine work time properties actually measures the degree of deterioration of a sand mixed with binder due to precuring. The usefulness of a binder system is greatly enhanced by having good work time properties. This is understandable because many foundry core and mold operations involve other functions like placing risers and sleeves, reinforcing bars, handling hooks, chills, etc., wherein the mixture of sand and resin undergoes varying degree of "pre-cure" before it is compacted in place.

A test to determine work time properties of a binder system involves preparing a sand mix with it. From this sand mix, tensile test specimens are prepared immediately and at periodic intervals. These specimens are allowed to cure and their tensile strengths are determined. The rate at which a binder system looses its strength as a function of pre-cure time, is a measure of its work time properties. The longer work time is shown by higher tensile strengths in the product. Another way to determine or compare relative work time is by determining the length of time it takes to gel a binder system.

The above remarks as to foundry operations also generally apply to refractory operations.

(b) Description of the Prior Art

U.S. Pat. No. 2,529,712 of Nov. 14, 1950 to E. Teague shows the preparation of abrasive products by coating abrasive grains with a phenolic resin and nitroalkane and then mixing powdered shellac with the coated abrasive. At least 50% of the bonding agent is shellac. The abrasive grains which are coated with phenolic resin, a nitroalkane, and shellac are cold pressed into the desired shaped article. The uncured article is then subjected to heat treatment at high temperature such as 160° C. to effect cure. The nitroalkane is described as a plasticizer for shellac in preparing the shaped article.

U.S. Pat. No. 2,531,863 of Nov. 28, 1950 to M. Scott et al. shows the preparation of anion exchange resins by reaction of phenol with formaldehyde in the presence of sodium hydroxide at a temperature of less than 30° C. and the subsequent reaction of such reaction product with a nitroalkane. The remaining nitro group is subsequently reduced to an amino group to prepare the anion exchange resin.

U.S. Pat. No. 2,760,951 of Aug. 28, 1956 to H. Parde et al. shows the reaction of nitromethane, phenol, and formaldehyde in the presence of a condensation catalyst at temperatures above 60° C. to produce thermosetting resins.

U.S. Pat. No. 3,917,558 of Nov. 4, 1975 to J. Gardikes et al. discloses the addition of nitroalkanes to various formaldehyde containing resins such as phenol-formaldehyde which contain free formaldehyde in order to scavenge or reduce the free formaldehyde content of the resin. The scavenger reaction is conducted at a pH above 7, preferably between 8 to 10. The reaction is conducted at temperatures of from about 40° C. to 90° C. for about a half hour to one hour. There is no mention of ambient temperature hardening under alkaline conditions nor the use of ester or lightburned magnesia hardeners in the Gardikes et al. patent.

U.S. Pat. No. 4,341,668 of Jul. 27, 1982 to J. Martin et al. describes trimethylol nitromethane as a compound suitable for providing methylene groups at a temperature above 135° C. for post-cure of cellulose which is impregnated or bonded with a composition containing an isocyanate in a hydrophobic diluent, an aqueous phenol-formaldehyde resin, and the trimethylol nitromethane.

U.S. Pat. No. 4,379,866 of Apr. 12, 1983 to F. Henry, Jr. et al. describes the use of tris(hydroxymethyl)nitromethane, also referred to as trimethylol nitromethane, as the formaldehyde-source, cross-linking agent for a phenol-formaldehyde or resorcinol polymer resin binder system for a plugging refractory's ability to withstand residence periods in a mud gun without premature solidification.

Canadian Patent 2,045,201 of Dec. 23, 1991 to J. Dieter et al describes the reduction of the formaldehyde content of a phenolformaldehyde based paint and solvent mixture by adding a nitroalkane to the mixture.

Technical Bulletin "TB 60" of the Angus Chemical Company discusses NIPAR 640 which is a mixture of nitroparaffins such as nitroethane and nitropropanes. The second page of that bulletin shows a composition of 20% NIPAR 640 and 80%, by weight, of isopropyl acetate as a thinner for acrylic ink. However, the isopropyl acetate is not an ambient temperature hardening agent for applicants, compositions having a high pH and high concentration of alkali metal as used in the ester cure process. It was found that the isopropyl acetate was immiscible in the highly alkaline resin.

SUMMARY OF THE INVENTION

It is an object of the invention to provide methods and compositions for retarding the ambient temperature hardening in an alkaline medium of a binder composition or a raw batch composition containing a phenolic resole resin and a hardening agent for said resin by contacting the resin and hardening agent with a nitroalkane.

It is a further object to provide a binder composition or a raw batch composition as mentioned above wherein the hardening agent is an organic ester, lightburned magnesium oxide, or a mixture of such magnesium oxide and organic ester.

In one aspect of this invention, an alkaline phenolic resole resin, i.e., a phenolic resole resin under alkaline conditions, has a pH of above 11 such as a pH of above 12 and the hardening is effected at ambient temperature by contacting the resin with the ester functional hardening agent and nitroalkane.

In another aspect of the invention a phenolic resole resin is hardened at ambient temperatures under alkaline conditions by contacting the resin and nitroalkane with an esterified methylolated phenolic compound such as that having from 1 to 3 carbon atoms in the acid component of the ester, e.g., wherein R of the group

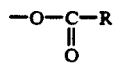

is hydrogen, methyl or ethyl such as that formed by esterifying formic, acetic or propionic acid and as is discussed more fully hereafter. The preferred acid component of the ester is that of the acetate wherein the acid component of the ester contains 2 carbon atoms. The preferred phenolic compound of the esterified methylolated phenolic compound is that of phenol.

In still another aspect of the invention a phenolic resole resin having a pH of about 4.5 to 9.5 is contacted with the nitroalkane and sufficient lightburned magnesium oxide either alone or together with an organic ester functional hardening agent to harden the mixture at an alkaline pH, preferably at a pH below 10 such as about 8 to 9.

In a further aspect, a hardening composition of a nitroalkane dissolved in an organic ester functional hardening agent is provided.

DETAILED DESCRIPTION OF THE INVENTION

Hardening Agents

The term "hardening agent" is used herein to denote a material which increases the rate of hardening of a phenolic resole resin under alkaline conditions at room temperature (R.T.) or at ambient temperature. Hardening, also referred to as curing, is attained with increases in viscosity and gelation to form a solid. Thus, hardening of the compositions of this invention, even with the use of the nitroalkane retarder, in the ester cure process takes less than one hour to develop tensile strengths of at least 20 psi and preferably tensile of at least 30 psi such as tensile of about 30 to 200 psi at 25° C. from the time the components of the binder composition are mixed with washed and dried, round grained silica sand at a concentration of 1.5% of resin based on the weight of sand in the presence of 25%, by weight of the resin, of an organic ester functional hardening agent. Without the hardener, the binder and raw batch compositions with or without the nitroalkane retarder, would take weeks or months to harden at 25° C.

By the term "room temperature" we mean a temperature of about 65° F. to 85° F.

By the term "ambient temperature" we mean a temperature of about 50° F. to 120° F. and preferably about 65° F. to about 110° F. or less such as 100° F.

Lightburned Magnesium Oxide Hardening Agents

Lightburned magnesium oxide has a surface area of from about 10 to 200 or more square meters per gram and preferably about 25 to 100 square meters per gram. The manufacture of lightburned magnesium oxide includes the calcining of magnesite ($MgCO_3$) or such magnesium compounds as the hydrate, or chloride at temperatures ranging from about 1600° F. (871° C.) to 1800° F. (982° C.).

Lightburned magnesium oxide products having different surface areas can be obtained from various sources such as the Martin Marietta Magnesia Specialties Company under the designator of MAGCHEM Magnesium Oxide Products. Lightburned magnesium oxides with the higher surface areas are more active and provide shorter times for gelation and hardening.

The quantity of lightburned magnesium oxide which is used in this invention as a hardener is an amount sufficient to increase the rate of gelation or hardening of the phenolic resole resin at ambient temperature. The quantity of the lightburned magnesium oxide hardener used will vary depending on surface area of the hardener, whether an organic ester hardener is also used in the hardener system, the particular ester hardening agent which may be used, the ambient temperature, and the desired result. Thus, the lightburned magnesium oxide hardening agent will generally vary from about 2% to 40% by weight, based on the weight of the phenolic resole resin (B.O.R.), and particularly from about 5% to 35% by weight of the resin.

The Organic Ester Functional Hardening Agent

The organic ester functional hardening agent can be used alone or in admixture with lightburned magnesium oxide. Mixtures of phenolic resole resins and an ester functional hardening agent, in the absence of magnesia or sufficient quantities of other alkaline earth oxides or hydroxides, will generally not harden at room temperature for several weeks or longer at an alkaline pH of below 10.

The organic ester functionality for hardening of the phenolic resole resins at ambient temperatures can be provided by lactones, cyclic organic carbonates, carboxylic acid esters, or mixtures thereof. These materials are simply referred to herein as organic ester functional hardening agents. Generally, low molecular weight lactones are suitable as the ester functional hardening agent, e.g., beta or gamma-butyrolactone, gamma-valerolactone, caprolactone, beta-propiolactone, beta-isobutyrolactone, beta-isopentyllactone, gamma-isopentyllactone, and delta-pentyllactone. Examples of suitable cyclic organic carbonates include, but are not limited to: propylene carbonate; ethylene carbonate; 1,3-butanediol carbonate; 1,2-pentanediol carbonate; and 1,3-pentanediol carbonate.

The carboxylic acid ester functional hardening agents include phenolic esters, and aliphatic esters. The aliphatic esters are preferably those of short or medium length, e.g., about 1 to 6 carbon mono- or polyhydric, saturated or unsaturated alcohols with short or medium chain length, e.g., about 1 to 6 carbon aliphatic, saturated or unsaturated carboxylic acids which can be mono- or polycarboxylic.

As to aromatic esters, such esters can be obtained by esterifying the aromatic, e.g., phenolic group or groups of a mono-or polyhydric aromatic phenol to prepare a formate or acetate ester of such aromatic compound. The aromatic ester can also be an esterified methylolated phenolic compound. The esters of methylolated phenolics contain one or more phenolic hydroxyl groups and/or one or more esterified phenolic hydroxyl groups and further containing one or more esterified methylol groups positioned ortho and/or para- to a phenolic hydroxyl group or esterified phenolic hydroxy group. These esters are referred to simply as esterified methylolated phenolic hardeners. Preferred esterified methylolated phenolic hardeners are those wherein the phenolic compound is the condensation product of phenol and formaldehyde and the acid component of the ester is formate, propionate, and particularly acetate. Such phenolic esters and their method of manufacture are disclosed in U.S. Pat. No. 5,051,454 of Sep. 24, 1991 to P. Lemon et al. which is incorporated herein in its entirety by reference. It will be understood that the esterified phenolic compound used may be a mono-, di- or polynuclear phenol wherein at least one esterified methylol group is attached to an aromatic ring carbon atom ortho- or para- to a phenolic hydroxyl group or esterified phenolic hydroxyl group. The acid portion of the phenolic esters can be the same as those of the aliphatic esters.

Specific carboxylic acid ester functional hardening agents include but are not limited to: n-butyl formate; ethylene glycol diformate; methyl and ethyl lactates; hydroxyethyl acrylate; ethylene glycol diacetate; triacetin (glycerol triacetate); dimethyl maleate; dimethyl glutarate; dimethyl succinate; dimethyl adipate; phenyl acetate; 2-acetyloxymethyl phenol; 2-methacryloxymethyl phenol; 2-salicyloxymethyl phenol; 2-acetyloxymethyl phenol acetate; 2,6-diacetyloxymethyl p-cresol acetate; 2,4,6- triacetyloxymethyl phenol; 2,4,6-triacetyloxymethyl phenol acetate; 2,6-diacetyloxymethyl phenol acetate; 2,2',6,6'-tetraacetyloxymethyl bisphenol A; and 2,2', 6,6'-tetraacetyloxymethyl bisphenol A diacetate. At times, it is advantageous to use mixtures of the ester functional hardening agents.

The ester functional hardening agent is present in an amount sufficient, either alone or together with lightburned magnesium oxide, to provide for ambient temperature hardening of the composition. The quantity of the ester will vary over a broad range such as from about 5% to 70% by weight of the phenolic resole resin. In the use of the ester cure process, the ester will generally vary from about 10% to 60% by weight of the resin and preferably from about 15% to 40% by weight of the resin. In the case ester is used with lightburned magnesium oxide, the quantity of ester will vary over a broad range such as that of about 5% to 50% by weight of the phenolic resole resin and preferably from about 10% to 40% by weight of the resin. In case the ester is an esterified methylolated phenolic, the quantity of the ester will generally vary from about 10% to 70% by weight of the resin. As with the lightburned magnesium oxide hardening agent, the exact quantity will depend on the particular ester hardener used, the amount and specific magnesium hardener used, if any, the temperature at which the composition is used or stored, and desired results.

The Phenolic Resole Resin

A broad range of phenolic resole resins may be used in this invention. These can be phenol formaldehyde resole resins or those wherein phenol is partially substituted by one or more phenolic compounds such as cresol, resorcinol, 3,5-xylenol, bisphenol-A , or other substituted phenols and the aldehyde portion can be partially replaced by acetaldehyde, furaldehyde, glutaraldehyde, or benzaldehyde. The preferred phenolic resole resin is the condensation product of phenol and formaldehyde. Resole resins are thermosetting, i.e., they form an infusible three dimensional polymer upon application of heat and are produced by the reaction of a phenol and a molar excess of a phenol-reactive aldehyde typically in the presence of an alkali metal or alkaline earth metal compound as condensing catalyst. Typically, the resole resin will be a phenol-formaldehyde resin produced by reacting phenol and formaldehyde in a molar ratio (phenol: formaldehyde) within the range of from about 1:1 to 1:3. A preferred molar ratio for use in this invention ranges from about one mole of the phenol for 1.2 moles of the aldehyde to about 1 mole of phenol for 2.6 moles of the aldehyde. The phenolic resole resin is used in aqueous solution or aqueous-organic solvent solution.

The pH of the phenolic resole resin used in this invention will generally vary over a broad range from about 4.5 to 13. However, hardening takes place at a pH above 7, i.e., in the alkaline range such as that above 7.5. The alkalinity or pH of the phenolic resole resin will also depend on the type of ester used and the presence or absence of lightburned magnesium oxide. The pH of the resin in the composition can initially be below that of 7 in the case when lightburned magnesium oxide is used as part of the hardener, either with or without organic ester functional hardening agent. The lightburned magnesium oxide in the composition is used in sufficient amount so that it causes the pH to rise and ambient temperature hardening takes place at a pH of about 8 or 9.

Any of the commonly used basic catalysts may be used to prepare the phenolic resole resin such as sodium hydroxide or potassium hydroxide. The preferred alkali in the product is potassium hydroxide. The alkali may be used in the manufacture of the resin or may be added to the resin subsequent to its preparation.

The molecular weight of the resin will vary from about 250 to 5,000 weight average molecular weight with 500 to about 2,500 being preferred. The weight average molecular weight (Mw) is measured using gel permeation chromatography and phenolic compounds and polystyrene standards. The sample molecular weight to be measured is prepared as follows: the resin sample is dissolved in tetrahydrofuran and slightly acidified with 1N hydrochloric or sulfuric acid and dried over anhydrous sodium sulfate. The salts which result are removed by filtration and the supernatant liquid run through a gel permeation chromatograph.

The resin solids in the phenolic resole resin can vary over a broad range such as that of about 30% to 85% by weight of the phenolic resole resin. Preferably, the resin solids vary from about 40% to 75% by weight of the phenolic resole resin. The viscosity of the resin can vary over a broad range such as that of about 100 to 4,000 cps at 25° C. Preferably, the viscosity varies from about 100 to 3,000 cps at 25° C. and particularly from about 100 to 2,000 cps at 25° C. The viscosity measurements herein are given in centipoise (cps) as measured by a Brookfield RVF viscometer at 25° C. or by Gardner-Holt viscosities at 25° C. The Gardner-Holt viscosities which are in centistokes are multiplied by the specific gravity (generally 1.2) to give the cps at 25° C.

The free formaldehyde content of the phenolic resole resin can vary over a broad range. Preferably, the free formaldehyde content of the resin is less than 1.5% B.O.R. and particularly less than 1% B.O.R.

The liquid portion of the resin is water or water together with a non-reactive solvent or a phenolic compound. Typical water contents for the resins used in this invention will vary from about 5% to 50% or more by weight of the resin depending on the use of the resin. The lower quantities of water are used in refractory compositions.

The Nitroalkanes

The nitroalkanes suitable for use in this invention have the formula:

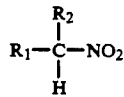

wherein each of $R_2$ and $R_1$ can be hydrogen, alkyl, or $R_1$ and $R_2$ together with the carbon to which they are attached form a cycloalkyl group and wherein the total number of carbon atoms for both $R_1$ and $R_2$ does not exceed 5. and particularly wherein the total number of carbon atoms in $R_1$ and $R_2$ does not exceed 3 so that the total number of carbon atoms in the nitroalkane does not exceed 4. Thus, the nitroalkanes used in this invention are mono-nitroalkanes which can be primary nitroalkanes when one of $R_1$ and $R_2$ is hydrogen and secondary nitroalkanes when both $R_1$ and $R_2$ are alkyl. Illustrative of nitroalkanes there can be mentioned: nitromethane; nitroethane; 1-nitropropane; 2-nitropropane; 1-nitrobutane; 1-nitropentane; nitrocyclopentane and nitrocyclohexane.

The quantity of nitroalkane used in this invention is an amount or quantity sufficient to slow the rate of viscosity increase, gelation or hardening of the resin composition. Such quantity can vary over a wide range depending on the activity of the particular nitroalkane, the amount of retardation desired, the room or ambient temperature, and the type and quantity of ester, or magnesium and ester hardening agents. The minimum quantity of retarder is generally about 0.5% based on the weight of the resin. Generally, the quantity of the retarder is no more than about 10% based on the weight of the resin. Preferred quantities of the retarder are from about 1% to 3% by weight of the phenolic resole resin.

In preparing the compositions of this invention, the nitroalkane is mixed in the binder at the above concentrations. Preferably, the nitroalkane is dissolved in the resin or the ester functional hardening agent so that it need not be separately mixed into the composition.

Ester-Nitroalkane Hardener Compositions

When an ester is used as the hardener or part of the hardener, the nitroalkane is preferably dissolved in the ester before the ester is mixed into the binder or raw batch composition. Such ester-nitroalkane hardener composition will contain from about 2% to 20% of the nitroalkane dissolved in 80% to 98% of the organic ester functional hardening agent and preferably from about 3% to 15% of the nitroalkane dissolved in 85% to 97% of the ester. This inhibited hardener can consist essentially of these two ingredients with minor quantities of other materials which do not destroy or significantly distract from the desirable properties of the inhibited hardener composition or its use in this invention.

The preferred esters for use in the ester-retarder compositions are cyclic organic carbonates having from 2 to 3 carbon atoms, lactones, particularly gamma lactones having from 4 to 6 carbon atoms, saturated carboxylic acid esters prepared from mono-or dicarboxylic acids having from 1 to 6 carbon atoms with mono-, di-, or trihydric alkanols having from 1 to 4 carbon atoms, and esterified methylolated phenol hardener wherein the acid component of the ester has from 1 to 3 carbon atoms such as that of formate, acetate, or propionate. Preferred specific ester functional hardening agents, for the ester-nitroalkane hardener compositions are those of gamma-butyrolactone, gamma-caprolactone, gamma-valerolactone, ethylene carbonate, propylene carbonate, methyl lactate, ethyl lactate, ethylene glycol diacetate, glycerol triacetate, dimethyl succinate, dimethyl glutarate, dimethyl adipate, esterified methylolated phenolic hardeners wherein the acid component of the ester has 1 to 3 carbon atoms, particularly 2 carbon atoms, and mixtures of the foregoing esters.

In the case of foundry compositions, the raw batch compositions will contain from about 0.5% to about 8% by weight of resin based on the weight the of the refractory aggregate whereas for refractory use the raw batch compositions will generally contain from about 3% to 20% by weight of the refractory aggregate and preferably from about 5% to 15% of the resin based on the weight of the refractory aggregate.

The aggregate may be any material which may be bound with a resin binder, i.e., to form a shaped article such as a foundry mold or core or a refractory article such as a refractory brick for furnace lining. The aggregate material may be in granular, powder, flake of fibrous form. Suitable aggregate materials for use in foundry applications include, but are not limited to, silica sand, quartz, chromite sand, zircon sand, olivine sand, and mixtures thereof. Suitable aggregate material for use in refractory applications include, but are not limited to magnesia such as periclase, alumina, zirconia, silica, silicon carbide, silicon nitride, boron nitride, bauxite, chromite, corundum and mixtures thereof.

The compositions of this invention can include additional modifiers or additives as is conventional in the art such as silanes, hexamethylene tetraamine, or urea. Organofunctional silane adhesion promoters, such as gamma-aminopropyl triethoxysilane or 3-glycidoxypropyltrimethoxy silane which can be used in amounts of about 0.05% to 1% by weight, based on the weight of resin, are recommended for use when compositions of this invention include siliceous aggregates, such as silica sands, crushed rock, silicates, and alumina based aggregates. In refractory applications, clays, metal powders (e.g. aluminum, magnesium, or silicon), and graphite are preferred additives. The amount of graphite generally varies from about 5% to 20% by weight of the refractory aggregate and the quantity of metal powder such a aluminum, magnesium and silica will generally vary from about 1% to 5% by weight of refractory aggregate.

The binder compositions of this invention are prepared by conventional means such as by mixing the various ingredients with and any other desired additives. Preferably, the nitroalkane is predissolved in the organic ester. In manufacture of the raw batch composition, the aggregate is mixed and coated with the binder composition. The hardener and retarder are preferably added during or just prior to the mixing stage so as not to harden the resin prematurely. Although it is preferable that the nitroalkane be predissolved in the resin or organic ester, it can be added separately. The mixing may be accomplished by means known in the art. The raw batch composition which results from the previous steps may be molded and subjected to pressure to form a shaped article.

The Hardeners And Alkalinity

The hardeners used in this invention require an alkaline pH, i.e., a pH above 7, for hardening of the binder or raw batch compositions. The exact pH of the alkaline conditions will depend on the hardener used. By the term "alkaline conditions" we mean an alkaline pH for the composition, particularly the aqueous resin solution or the aqueous-organic solvent solution of the resin.

The resole resin used in this invention can possess the required alkalinity on manufacture or additional alkaline, i.e., basic, material can be added to the resin or the hardenable composition to attain the desired alkalinity.

When the hardener is lightburned magnesium oxide alone or together with an ester functional hardening agent, the pH of the resin can be below 7 such as a pH of 4.5 or higher and a sufficient amount of the lightburned magnesium oxide needs to be present to neutralize the acidity and to provide sufficient magnesium oxide for the crosslinking and hardening of the resin. Hardening of the resin when the hardener is lightburned magnesium oxide or such oxide together with the ester hardener takes place at a pH of about 8 or 9. Thus, the pH of the resin can be from about 4.5 to 9.5 and preferably about 5 to 9 before mixing the alkalizing lightburned magnesium oxide with the resin. Ambient temperature hardening systems for phenolic resole resins using lightburned magnesium oxide or lightburned magnesium oxide with an ester at a pH below 10 are set forth in U.S. Pat. No. 5,096,983 of Mar. 17, 1992 to A. Gerber which is incorporated herein by reference in its entirety.

When an organic ester functional hardening agent is used without lightburned magnesium oxide, a pH of at least 11 and above and preferably of about 12 or above is generally required for ambient temperature hardening. The use of such esters above a pH of about 11 for room temperature or ambient temperature hardening is part of the "ester cure" process. For such organic ester functional hardening compositions which require a pH above 11 for the ambient or room temperature hardening (ester cure), the mole ratio of alkali such as KOH to the total amount of free and combined phenol in the resin should be in the range of from about 0.2:1 to about 1.2:1, preferably from about 0.4:1 to about 0.9:1 of the alkali to the total phenol. Ambient temperature hardening systems for phenolic resole resins using ester functional hardening agents under highly alkaline conditions, e.g., above a pH of 11, i.e., ester cure process, include the following patents whose entire disclosure is incorporated herein by reference, namely, U.S. Pat. No. Re 32,812 of Dec. 27, 1988 to P. Lemon et al.; U.S. Pat. No. 5,082,876 of Jan. 21, 1992 to S. R. Iyer et al.; U.S. Pat. No. 5,036,116 of Jul. 30, 1991 to S. R. Iyer et al.; U.S. Pat. No. 4,831,067 of May 16, 1989 to P Lemon et al.; and U.S. Pat. No. 4,988,745 of Jan. 29, 1991 to S. R. Iyer et al.

Some esters harden the phenolic resole resins under alkaline conditions at a pH less than 11 as well as at pH of above 11 without the use of lightburned magnesium oxide hardeners. Such esters are the esterified methylolated phenolic hardeners, particularly when the methylolation is both para- and ortho- to the phenolic hydroxyl group or esterified phenolic hydroxyl group of the phenolic compound. The use of such esters for room temperature hardening of phenolic resole resins is disclosed in U.S. Pat. 5,051,454 of Sep. 24, 1991 which issued to P. Lemon et al., and the entire disclosure of that patent is incorporated herein by reference.

In order that those skilled in the art may more fully understand the invention presented herein, the following procedures and examples are set forth. All parts and percentages in the examples, as well as elsewhere in this application, are by weight, unless otherwise specified.

Procedure For Gel Determination Of Examples 4, 5 and 7

A screw cap glass vial (28×95 mm) is charged with: 6.0 grams (g) of Resin A additives if any; water; and gamma ($\gamma$)-butyrolactone as shown in the applicable example or table. The solution is mixed well prior to addition of lightburned magnesium oxide as set forth in the applicable example or table. The mixture is thoroughly mixed for one minute using a S/P Vortex Mixer of American Scientific Products at a setting of 9. Five grams of this mixture is immediately transferred to a glass test tube (18×155mm). A glass rod with a magnetized head fitting is introduced into the mixture and fitted to a Sunshine Gel Time Meter which is then turned on. The tube is immersed in a 25° C. water bath throughout the test. The time of gelation is signified when the magnetized head stops turning and also by the sounding of an audible signal.

Procedure For Gel Determination of Example 6

The equipment and reagents were as follows: wax coated Solo cup, 5 oz.; thermometer, −30° C. to 50° C.; stop watch to read to 1 second; polyethylene transfer pipets, jumbo bulb; triacetin, A.R. grade or purified grade; constant water bath, 25° C.; top loading balance to read to 0.1 g (gram). The procedure was as follows: weigh 40 grams of resin at 25° C. into a 5 oz. wax coated Solo cup; add 10 g ester at 25° C.; place cup in a constant temperature water bath at 25° C.; start stop watch and begin stirring with a thermometer, stir continuously along the sides of cup and not the bottom, keep cup in bath as much as possible; stir until resin no further forms a string when thermometer is pulled out of the resin since this shows gelation; stop watch as quickly as possible and record the gel time to the nearest 0.1 minute; clean thermometer immediately with wet paper towel or a scouring pad to remove gelled resin.

Properties of Phenolic Resole Resin M

Phenolic resole Resin M, or simply Resin M, is prepared by reacting phenol and formaldehyde in a molar ratio of one mole of phenol for each 1.25 moles of formaldehyde in the presence of sodium hydroxide as catalyst. The resin has the following properties: solids 68.6%; free phenol 15.7%; water 11.7%; pH of 8.9; weight average molecular weight of 290; and a viscosity of about 250 cps at 25° C.

Preparation of Phenolic Resin N

Phenolic Resole Resin N, or simply Resin N, is a phenol formaldehyde resole resin prepared by reacting phenol (P) with 50% formaldehyde (F) at a F/P molar ratio of 1.25 using sodium hydroxide as catalyst. This resin intermediate is formulated with acetic acid and methanol to provide Resin N which has: a viscosity at 25° C. of 2,560 Centistokes, or approximately 3,000 cps at 25° C.; 74% solids; 7% free phenol; 7% methanol; 12% water; a pH of 5.8; and a weight average molecular weight of 3,000.

Properties of Phenolic Resole Resin P

Phenolic Resole Resin P, or simply Resin P, has the following product characteristics: F (formaldehyde)/P (phenol) molar ratio of 1.8; KOH/P molar ratio of 0.85; K/P molar ratio of 0.594; 45% of water; 0.1% of free formaldehyde; a pH of 12.5 to 13; number average molecular weight of 389; weight average molecular weight of 1504; Z average molecular weight of 4054; and a polydispersity index of 3.85. This is a resin for use in the ester cure process.

EXAMPLE 1

Hardener Formulations

A series of hardener compositions were tested. Some of the compositions contained a nitroalkane as indicated in Table 1. The hardeners containing a nitroalkane were prepared by dissolving the nitroalkane in the ester. The quantities of the ingredients containing the nitroalkane are on a weight basis based on the weight of the composition which consists of both the ester and nitroalkane. The ester hardeners, used in this example and shown in Table 1 were: gamma butyrolactone which is designated as "R" in Table 1; a mixture containing equal weights of gamma-butyrolactone and triacetin which is designated as "S" in Table 1; Triacetin which is designated a "T" in Table 1; a mixture containing 33 parts of DBE-9 and 67 parts by weight of triacetin and which is designated as "U" in Table 1 (DBE-9 is a mixture of the dimethyl esters of glutaric, adipic, and succinic acids which can be obtained from the Du Pont Chemical Company); and a mixture of 15 parts of triacetin and 85 parts of DBE-9 which is designated as "V" in Table 1. The hardener formulations of this example were used in the tests of Examples 2 and 3.

TABLE 1

HARDENER FORMULATIONS

Composition (% by weight)

| Hardener | R | S | T | U | V | NITRO ETHANE | 1-NITRO PROPANE |
|---|---|---|---|---|---|---|---|
| Control A | 100% | — | — | — | — | — | — |
| Sample 1 | 95% | — | — | — | — | — | 5% |
| Control B | — | 100% | — | — | — | — | — |
| Sample 2 | — | 95% | — | — | — | 5% | — |
| Control C | — | — | 100% | — | — | — | — |
| Sample 3 | — | — | 95% | — | 5% | — | — |
| Sample 4 | — | — | 95% | — | — | 5% | — |
| Control D | — | — | — | 100% | — | — | — |
| Sample 5 | — | — | — | 95% | — | 5% | — |
| Sample 6 | — | — | — | 95% | — | — | 5% |
| Control E | — | — | — | — | 100% | — | — |
| Sample 7 | — | — | — | 95% | 5% | — | — |
| Sample 8 | — | — | 85% | — | — | 15% | — |

EXAMPLE 2

Sand Tests

All sand tests were run using a washed and dried silica sand (Wedron 730).

A known quantity of sand was weighed into the bowl of a Kitchen Aid mixer. The sand was brought to the specified sand temperature as shown in Table 2. 1.5% based on sand weight of a no-bake (ester cure) resin designated as Resin P was added to the sand in each case and mixed for about 1 minute. Physical and chemical properties of Resin P are set forth hereinabove. 25%, based on the resin weight, of ester functional hardener as indicated in Table 2 was then added and the contents mixed vigorously for about 30–40 seconds.

The mixed sand was rammed into tensile test specimens in 12 cavity gang boxes. The pre-cure time shown in Table 2, denotes the time at which test specimens were prepared, measured from the end of the mixing cycle. The time, in minutes, for the end of the mixing cycle is in the line across from the entry "sand" in Table 2.

The tensile test specimens were allowed to cure (harden) under ambient temperature conditions in a room having a temperature of about 24° C. Their strengths were determined using a Dietert 400-1 Universal Sand Strength machine.

TABLE 2

SAND TESTS

All the sand tests were run with a washed and dried silica sand at the prescribed sand temperature, using 1.5%, based on sand weight, of Resin P and 25%, based on resin weight, of the specified hardener.

| Hardener Name | Sand Temp (°C.) | Precure Time (min.) 24 hr Tensile (psi) | | | | | |
|---|---|---|---|---|---|---|---|
| | | 0 | 1.5 | 3 | 5 | 6 | 8 | 10 |
| Control A | 25°C. | 88 | 14 | — | — | — | — | — |
| Sample 1 | " | 95 | 42 | — | — | — | — | — |
| Control B | 30° C. | 86 | — | 14 | — | — | — | — |
| Sample 2 | " | 88 | — | 40 | — | — | — | — |
| Control C | 30° C. | 118 | — | — | — | 42 | — | — |
| Sample 3 | " | 141 | — | — | — | 108 | — | — |
| Control C | 30° C. | 115 | — | — | 66 | — | — | — |
| Sample 4 | " | 118 | — | — | 83 | — | — | — |
| Control D | 40° C. | 110 | — | — | — | 40 | — | — |
| Sample 5 | " | 112 | — | — | — | 62 | — | — |
| Control D | 40° C. | 97 | — | — | — | — | 20 | — |
| Sample 6 | " | 97 | — | — | — | — | 41 | — |
| Control E | 40° C. | 84 | — | — | — | — | 44 | — |
| Sample 7 | 40° C. | 77 | — | — | — | — | — | 69 |
| Control D | 40° C. | 126 | — | 56 | — | — | — | — |
| Sample 8 | " | 112 | — | 77 | — | — | — | — |

EXAMPLE 3

Tests with Reclaimed Silica

The data shown in Table 3 was obtained with a dry attrition reclaimed silica sand obtained from a foundry using ester cured phenolic no-bake binder systems in their core and mold making operations.

TABLE 3

TESTS WITH RECLAIMED SILICA

| Hardener Name | Sand Temp. | Precure Time (min) | |
|---|---|---|---|
| | | 0 | 6 |
| | | 24 hr. Tensile (psi) | |
| Control D | 40° C. | 42 | 19 |
| Sample 5 | " | 41 | 29 |

EXAMPLE 4

Hardening Tests

This example was performed to show the retardation in gel time of phenolic resole resins by use of nitroalkanes with a mixture of lightburned magnesium oxide and an organic ester functional hardening agent as well as with lightburned magnesium oxide alone as the hardener. The results of these tests are shown in Table 4. The procedure for the gel tests as well as the properties and preparation of phenolic resole Resin M and phenolic resole Resin N are set forth hereinabove. The percent of gamma-butyrolactone, percent water, as well as the percent of lightburned magnesium oxide in the Table are based on the weight of the resin (B.O.R.). The magnesium oxide (MgO) used in this example was a lightburned magnesium oxide having a surface area of 65 square meters per gram. The percentage reading which is in parenthesis after the additive is the percent by weight of the nitroalkane, based on the weight of resin. NIPAR 640 is a product of Angus Chemical Co. and is a 60/40 blend of nitroethane/1-nitropropane. In the last two experiments in Table 4, the gamma-butyrolactone was replaced with an equal quantity of an inert solvent, namely, 2-methoxyethyl ether as indicated by the asterisk.

TABLE 4

HARDENING TESTS

| Resin | % B.O.R. | | | Additive | Gel Time |
|---|---|---|---|---|---|
| | H₂O | Ester | MgO | | |
| M | 20 | 15 | 15 | None | 223 |
| M | 20 | 15 | 15 | NIPAR 640 (4%) | >265 |
| M | 20 | 15 | 15 | Nitromethane (4%) | 329 |
| M | 15 | 15 | 20 | None | 163 |
| M | 15 | 15 | 20 | NIPAR 640 (2%) | 190 |
| M | 15 | 15 | 20 | NIPAR 640 (4%) | 213 |
| N | 10 | 25 | 15 | None | 75 |
| N | 10 | 25 | 15 | NIPAR 640 (2%) | 84 |
| N | 10 | 25 | 15 | NIPAR 640 (5%) | 103 |
| N | 10 | 25 | 15 | Nitromethane (2%) | 77 |
| N | 10 | 25 | 15 | Nitromethane (5%) | 99 |
| N | 10 | * | 15 | None | 121 |
| N | 10 | * | 15 | NIPAR 640 (4%) | 143 |

*25% of 2-methoxyethyl ether, an inert solvent replaced the ester.

EXAMPLE 5

Resin with Increased Formaldehyde Content

This example was performed to determine the effect of a nitroalkane on a phenolic resole resin to which formaldehyde was added. This example was performed by using Resin N as a control and then adding 1.25% of formaldehyde to Resin N. This resin with the added free formaldehyde is referred to as Resin NF in Table 5. Resin N used in this example had aged a few months from the time that Example 4 was performed. The same procedure used in Example 4 was used in this example. The lightburned magnesium oxide (MgO) used had a surface area of 65 square meters per gram. The ester used in this example was gamma-butyrolactone.

The results of this example are shown in Table 5. It can be seen from Table 5 that the addition of nitroalkane (NIPAR) at a 5% level caused retardation in the gel time of Resin NF.

TABLE 5

HARDENING TESTS OF RESIN WITH INCREASED FREE FORMALDEHYDE

| Resin | % B.O.R. | | | Additive | Gel Time |
|---|---|---|---|---|---|
| | H₂O | Ester | MgO | | |
| N | 10 | 25 | 15 | None | 59 |
| NF | 10 | 25 | 15 | None | 64 |
| NF | 10 | 25 | 15 | NIPAR 640 (5%) | 85 |

EXAMPLE 6

Effect of Free Formaldehyde in Resin

Samples of Resin P and Resin P to which different levels of formaldehyde were added were prepared and analyzed for free formaldehyde content as shown in Table 6. The ester functional hardener-retarder which was used in each sample contained 95% of triacetin and 5% of nitroethane. The quantity of ester based on the weight of the resin was 25%. The procedure for determining gel time is set forth hereinabove. The results of this example are shown in Table 6. It can be seen from Table 6 that free formaldehyde had little to no effect on the retarding effect of the nitroethane.

TABLE 6

| Resin % | Free Formaldehyde | Gel Time |
|---|---|---|
| P | 0.06 | 10 min. 3 sec. |

TABLE 6-continued

| Resin % | Free Formaldehyde | Gel Time |
| --- | --- | --- |
| P + 1% HCHO | 0.54 | 10 min. 5 sec. |
| P + 3% HCHO | 1.96 | 10 min. 15 sec. |

EXAMPLE 7
Effect of Isopropyl Acetate

This example was performed to determine the effect, if any, of isopropyl acetate as a hardening agent. The resin used was Resin P, and the example was run: with and without 5% B.O.R. of NIPAR 640 as the retarder; with triacetin or isopropyl acetate as the ester; and the use of 2-methoxyethyl ether at a concentration of 5% B.O.R. when the NIPAR 640 was not used. The ester was at a concentration of 25% B.O.R. The results of this example are shown in Table 7. It can be seen from Table 7 that NIPAR 640 retarded the gelling of the samples containing triacetin. However, it was found that isopropyl acetate is immiscible in Resin P which contains a high potassium content and has a high pH. The resin with isopropyl acetate had not gelled after 350 minutes in the Sunshine Gel Time Meter. After sitting overnight, the sample containing the isopropyl acetate was agitated in order to mix the ingredients. The agitation was repeated about 4 times at about 2 hour intervals and the samples were left to stand overnight. However, the samples containing the isopropyl acetate had not gelled and remained fluid for at least 2 days.

TABLE 7
EFFECT OF ISOPROPYL ACETATE

| SAMPLE NO. | NIPAR 640 | ESTER | 2-METHOXY-ETHYL-ETHER | GEL TIME IN MINUTES |
| --- | --- | --- | --- | --- |
| 1 | 5% | Triacetin | — | 29 |
| 2 | 5% | Triacetin | — | 31 |
| 3 | — | Triacetin | 5% | 9 |
| 4 | — | Triacetin | 5% | 10 |
| 5 | 5% | Isopropyl Acetate | — | None* |

*The sample with isopropyl acetate had not gelled after at least 2 days.

What is claimed is:

1. A method for retarding the ambient temperature hardening of a phenolic resole resin and a hardening agent which hardens the resin at ambient temperature under alkaline conditions which comprises contacting said resin and hardening agent with a nitroalkane and permitting the resin to harden under alkaline conditions wherein the nitroalkane is in a amount sufficient to retard the hardening, said nitroalkane having the formula:

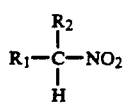

wherein each of $R_1$ and $R_2$ is a member selected from the group consisting of hydrogen, alkyl group having from 1 to 5 carbon atoms and wherein $R_1$ and $R_2$ taken together with the carbon to which they are attached is a cycloaliphatic group and wherein the total number of carbon atoms in the nitroalkane does not exceed 6.

2. The method of claim 1 wherein the total number of carbon atoms in the nitroalkane does not exceed 4.

3. The method of claim 1 wherein the temperature is from about 65° F. to 100° F.

4. The method of claim 2 wherein the hardening agent is a member selected from the group consisting of: lightburned magnesium oxide; an organic ester functional hardening agent; and a mixture of lightburned magnesium oxide and an organic ester functional hardening agent.

5. The method of claim 4 wherein the resin is the reaction product of phenol and formaldehyde having a pH of at least 11 and the hardener is an organic ester functional hardening agent.

6. The method of claim 4 wherein the resin is the reaction product of phenol and formaldehyde having a pH of about 4.5 to 9.5 and the hardener is member selected from the group consisting of lightburned magnesium oxide and a mixture of lightburned magnesium oxide and organic ester functional hardening agent.

7. The method of claim 6 wherein the hardener is lightburned magnesium oxide.

8. A method for retarding the ambient temperature hardening of a phenolic resole resin and a hardening agent which hardens the resin at ambient temperature under alkaline conditions which comprises contacting said resin with a hardening agent in sufficient quantity to harden the resin, said hardening agent selected from the group consisting of lightburned magnesium oxide, gamma-butyrolactone, gamma-caprolactone, gamma-valerolactone, ethylene carbonate, propylene carbonate, methyl lactate, ethyl lactate, ethylene glycol diacetate, glycerol triacetate, dimethyl adipate, dimethyl glutarate, dimethyl succinate, an esterified phenol having at least one phenolic hydroxyl group and/or esterified phenolic hydroxyl group and further having at least one esterified methylol group ortho- and/or para- to a phenolic hydroxyl group or esterified phenolic hydroxyl group wherein the acid component of the ester has from 1 to 3 carbon atoms, and mixtures of said hardening agents with a nitroalkane in an amount sufficient to retard the hardening, said nitroalkane having the formula:

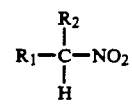

wherein each of $R_1$ and $R_2$ is a member selected from the group consisting of hydrogen, alkyl group having from 1 to 5 carbon atoms and wherein $R_1$ and $R_2$ taken together with the carbon to which they are attached is a cycloaliphatic group and wherein the total number of carbon atoms in the nitroalkane does not exceed 6.

9. The method of claim 8 wherein the hardening agent is gamma-butyrolactone.

10. The method of claim 8 wherein the hardening agent is ethylene carbonate.

11. The method of claim 8 wherein the hardening agent is propylene carbonate.

12. The method of claim 8 wherein the hardening agent is methyl lactate.

13. The method of claim 8 wherein the hardening agent is ethyl lactate.

14. The method of claim 8 wherein the hardening agent is ethylene glycol diacetate.

15. The method of claim 8 wherein the hardening agent is glycerol triacetate.

16. The method of claim 8 wherein the hardening agent is dimethyl adipate, dimethyl glutarate, dimethyl succinate or mixtures thereof.

17. The method of claim 8 wherein the total number of carbon atoms in the nitroalkane does not exceed 4, the temperature is from about 65° F. to 100° F., and the alkaline conditions have a pH of at least 11.

18. The method of claim 8 wherein the alkaline conditions are at a pH of at least 11 and the hardening agent is an ester.

19. The method of claim 8 wherein the total number of carbon atoms in the nitroalkane does not exceed 4, the temperature is from about 65° F. to 100° F., the alkaline conditions are at a pH of less than 10.

20. The method of claim 19 wherein the hardening agent is lightburned magnesium oxide.

21. A method for retarding the hardening of a composition comprising a phenolic resole resin which comprises contacting at a temperature of about 50° F. to 120° F.:
   A. a hardenable, alkaline phenolic resole resin having a solids content of from about 40% to about 75% by weight thereof, an aldehyde to phenol molar ratio of from about 1.2:1 to about 2.6:1; an alkali to phenol molar ratio of from about 0.2:1 to about 1.2:1; and a pH above 11;
   B. an organic ester functional hardening agent selected from the group consisting of an organic carbonate, a lactone, a carboxylic acid ester, and mixtures thereof in an amount sufficient to harden the resin; and
   C. a nitroalkane in an amount sufficient to retard the hardening of the resin, said nitroalkane having the formula:

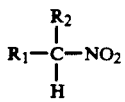

wherein each of $R_1$ and $R_2$ is a member selected from the group consisting of hydrogen, alkyl having from 1 to 5 carbon atoms and wherein $R_1$ and $R_2$ taken together with the carbon to which they are attached is a cycloaliphatic group and wherein the total number of carbon atoms in the nitroalkane does not exceed 6.

22. The method of claim 21 wherein: the temperature is from 65° F. to 110° F.; and the nitroalkane has from 1 to 4 carbon atoms.

23. The method of claim 21 wherein the hardening agent is selected from the group consisting of gamma-butyrolactone, gamma-caprolactone, gamma-valerolactone, ethylene carbonate, propylene carbonate, methyl lactate, ethyl lactate, ethylene glycol diacetate, glycerol triacetate, dimethyl adipate, dimethyl glutarate, dimethyl succinate, an esterified phenol having at least one phenolic hydroxyl group and/or esterified phenolic hydroxyl group and further having at least one esterified methylol group ortho- and/or para- to a phenolic hydroxyl group or esterified phenolic hydroxyl group wherein the acid component of the ester has from 1 to 3 carbon atoms, and mixtures of said hardening agents.

24. The method of claim 21 wherein the ester is a lactone.

25. The method of claim 21 wherein the ester is a cyclic organic carbonate.

26. The method of claim 21 wherein the ester is glycerol triacetate.

27. A method for retarding the hardening of a composition comprising a phenolic resole resin which comprises contacting at a temperature of about 50° F. to 120° F.:
   A. a hardenable, phenolic resole resin having a pH of about 4.5 to 9.5;
   B. a hardening agent selected from the group consisting of lightburned magnesium oxide and lightburned magnesium oxide together with an organic ester functional hardening agent is an amount sufficient to harden the resin at said temperature at an alkaline pH of less than 10; and
   C. a primary or secondary nitroalkane having one nitro-group and 1 to 6 carbon atoms in an amount sufficient to retard the hardening of the resin.

28. The method of claim 27 wherein the hardening agent is lightburned magnesium oxide together with an organic ester functional hardening agent and wherein said ester is a lactone.

29. The method of claim 27 wherein the hardening agent is lightburned magnesium oxide together with an organic ester functional hardening agent and the ester is a cyclic organic carbonate.

30. The method of claim 27 wherein the hardening agent is lightburned magnesium oxide.

31. The method of claim 27 wherein the ester is gamma-butyroilactone.

32. A method for retarding the hardening of a phenol-formaldehyde resole resin and an organic ester functional hardening agent at ambient temperature which comprises mixing:
   A. a hardenable, alkaline phenol-formaldehyde resole resin having a solids content of from about 40% to about 75% by weight thereof, a formaldehyde to phenol molar ratio of from about 1.2:1 to about 2.6:1; an alkali to phenol molar ratio of from about 0.2:1 to about 1.2:1; and a pH above 11;
   B. an organic ester functional hardening agent selected from the group consisting of an organic carbonate, a lactone, a carboxylic acid ester, and mixtures thereof in an amount sufficient to harden the resin;
   C. a primary or secondary nitroalkane having one nitro group and 1 to 6 carbon atoms in an amount sufficient to retard the hardening of the resin; and then permitting the resin to cure to a solid.

33. The method of claim 32 wherein the nitroalkane has from 1 to 4 carbon atoms.

34. The method of claim 33 wherein the ester is an aliphatic ester.

35. A method for retarding the hardening of a phenol-formaldehyde resole resin at ambient temperature which comprises mixing:
   A. a hardenable, phenol-formaldehyde resole resin having a pH of about 4.5 to 9.5;
   B. a hardening agent selected from the group consisting of lightburned magnesium oxide and lightburned magnesium oxide together with an organic ester functional hardening agent in an amount sufficient to harden the resin at an alkaline pH of less than 10;
   C. a primary or secondary nitroalkane having one nitro group and 1 to 6 carbon atoms in an amount sufficient to retard the hardening of the resin; and then permitting the resin to cure to a solid.

36. The method of claim 35 wherein the molar ratio of formaldehyde to phenol is from about 1.2 to 2.6 moles of formaldehyde per mole of phenol and wherein the hardening agent is lightburned magnesium oxide together with an ester functional hardening agent.

37. The method of claim 36 wherein the ester is an aliphatic ester.

* * * * *